US009977821B2

(12) United States Patent
Krishnan et al.

(10) Patent No.: US 9,977,821 B2
(45) Date of Patent: May 22, 2018

(54) METHOD AND SYSTEM FOR AUTOMATICALLY GENERATING A TEST ARTIFACT

(71) Applicant: Wipro Limited, Bangalore (IN)

(72) Inventors: Krishnaraj Padur Krishnan, Bangalore (IN); Hemantha Kumar Choudam, Bangalore (IN)

(73) Assignee: Wipro Limited, Bangalore (IN)

( * ) Notice: Subject to any disclaimer, the term of this patent is extended or adjusted under 35 U.S.C. 154(b) by 608 days.

(21) Appl. No.: 14/634,161

(22) Filed: Feb. 27, 2015

(65) Prior Publication Data

US 2016/0148130 A1    May 26, 2016

(30) Foreign Application Priority Data

Nov. 26, 2014 (IN) .......................... 5916/CHE/2014

(51) Int. Cl.
*G06F 17/30* (2006.01)
*G06F 15/16* (2006.01)
*G06Q 10/06* (2012.01)

(52) U.S. Cl.
CPC ..... *G06F 17/30575* (2013.01); *G06Q 10/067* (2013.01); *G06Q 10/0633* (2013.01)

(58) Field of Classification Search
None
See application file for complete search history.

(56) References Cited

U.S. PATENT DOCUMENTS

| 7,069,234 | B1* | 6/2006 | Cornelius | G06Q 20/10 |
| | | | | 705/26.35 |
| 7,167,844 | B1* | 1/2007 | Leong | G06Q 30/04 |
| | | | | 705/37 |
| 7,246,144 | B2* | 7/2007 | Walsh | G06Q 10/06 |
| | | | | 705/7.27 |
| 7,610,233 | B1* | 10/2009 | Leong | G06Q 10/087 |
| | | | | 705/26.3 |
| 8,413,107 | B2* | 4/2013 | Brininstool | G06F 8/20 |
| | | | | 709/203 |
| 9,058,571 | B2* | 6/2015 | Guizar | G06Q 10/06 |
| 2002/0144256 | A1* | 10/2002 | Budhiraja | G06F 8/67 |
| | | | | 717/174 |
| 2003/0191988 | A1* | 10/2003 | Dalal | G06F 11/3414 |
| | | | | 714/39 |

(Continued)

*Primary Examiner* — Gurkanwaljit Singh
(74) *Attorney, Agent, or Firm* — LeClairRyan PLLC

(57) ABSTRACT

A method of automatically generating a test artifact is disclosed. The method involves executing a business process comprising one or more web services; monitoring the business process to identify process modules of the business process invoking the at least one web service, wherein the one or more process modules invoking the at least one web service corresponds to one or more integration points; mapping the one or more integration points to one or more corresponding nodes of a business process model associated with the business process; mapping data parameters associated with each node upstream of the one or more mapped nodes of the business process model to one or more request data fields of a test script; and generating, by the hardware processor, the test artifact by automatically populating the request data fields with test data corresponding to the data parameters associated with the one or more request data fields.

18 Claims, 3 Drawing Sheets

(56) References Cited

U.S. PATENT DOCUMENTS

| | | | | |
|---|---|---|---|---|
| 2005/0114201 A1* | 5/2005 | Walsh | ............... | G06Q 10/06 709/200 |
| 2009/0063225 A1* | 3/2009 | Baeyens | ............... | G06Q 10/06 717/108 |
| 2010/0017783 A1* | 1/2010 | Brininstool | ............... | G06F 8/20 717/101 |
| 2014/0310243 A1* | 10/2014 | McGee | ............... | G06F 17/30575 707/639 |

* cited by examiner

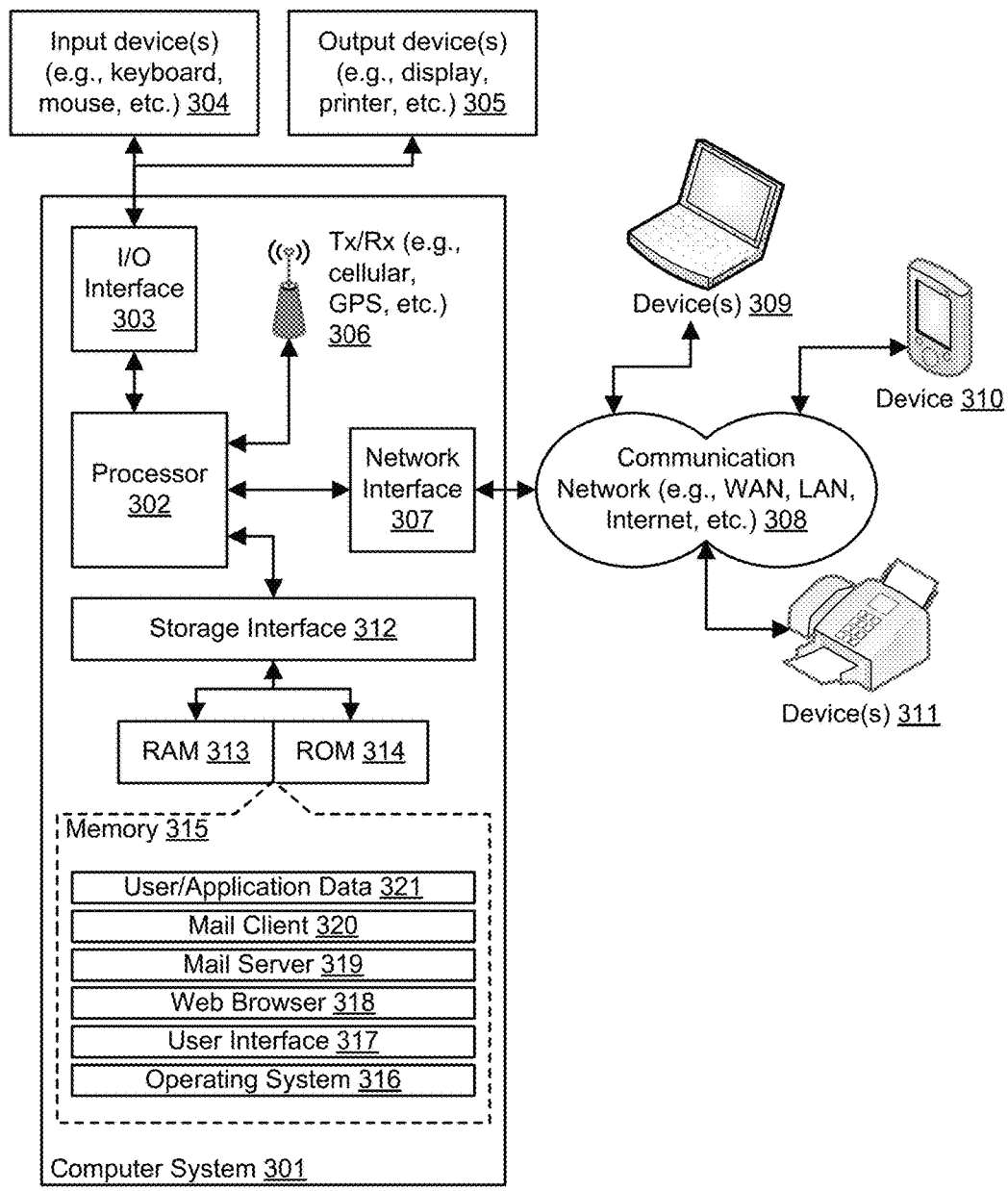
FIG. 3: Example Computer System

METHOD AND SYSTEM FOR AUTOMATICALLY GENERATING A TEST ARTIFACT

This application claims the benefit of Indian Patent Application Serial No. 5916/CHE/2014 filed Nov. 26, 2014, which is hereby incorporated by reference in its entirety.

FIELD

This disclosure relates generally to software application testing, and more particularly to a method and system for automatically generating test cases for web service testing.

BACKGROUND

Web Service testing is typically performed in siloes and follows a bottom-up approach. As a result, a test engineer may lack a top-down view of the business functionality which the Web Service is catering to. The test engineer may have to connect with multiple teams and go through multiple documents to arrive at the functional scenarios that need to be tested, still risking the possibility of missing out on covering a few scenarios. Further, the test data preparation activity for testing Web Services may typically be a highly time consuming manual activity. Depending on the complexity and size of the Web Service request messages this effort could grow to daunting levels. Preparing the Web Service Request XML data combinations covering all the fields (mandatory as well as optional) of the Request XML for the system testing of a Web Service is typically a tedious manual task today. The data scenarios for testing the web service should ensure that all functional scenarios where the Web Service is getting consumed as part of a business process are covered, to start with. The data scenarios should also ensure adequate coverage of all the Request XML fields without compromising on the test coverage.

The manual nature of the web service testing places a high emphasis on highly skilled domain resources since this activity is domain intensive and highly dependent on the domain knowledge of the domain experts. While testing integration between various sub-systems of a web service, generating integration test scripts requires the test engineer to be aware of technical areas including XML, SOAP, etc—thereby creating a dependence on highly skilled domain experts for the testing activity.

SUMMARY

In one embodiment, a method of automatically generating a test artifact is disclosed. The method involves executing, using a hardware processor, a business process comprising one or more web services; monitoring the business process to identify one or more process modules of the business process invoking the at least one web service, wherein the one or more process modules invoking the at least one web service corresponds to one or more integration points; mapping the one or more integration points to one or more corresponding nodes of a business process model associated with the business process; mapping data parameters associated with each node upstream of the one or more mapped nodes of the business process model to one or more request data fields of a test script; and generating, by the hardware processor, the test artifact by automatically populating the request data fields with test data corresponding to the data parameters associated with the one or more request data fields.

In another embodiment, a system for automatically generating a test artifact is disclosed. The system comprises a processor and a memory storing instructions executable by the at least one processor, the instructions comprising instructions to: execute a business process comprising one or more web services; monitor the business process to identify one or more process modules of the business process invoking the at least one web service, wherein the one or more process modules invoking the at least one web service corresponds to one or more integration points; map the one or more integration points to one or more corresponding nodes of a business process model associated with the business process; map data parameters associated with each node upstream of the one or more mapped nodes of the business process model to one or more request data fields of a test script; and generate the test artifact by automatically populating the request data fields with test data corresponding to the data parameters associated with the one or more request data fields.

It is to be understood that both the foregoing general description and the following detailed description are exemplary and explanatory only and are not restrictive of the technology, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a block diagram of an exemplary artifact generating computing device for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
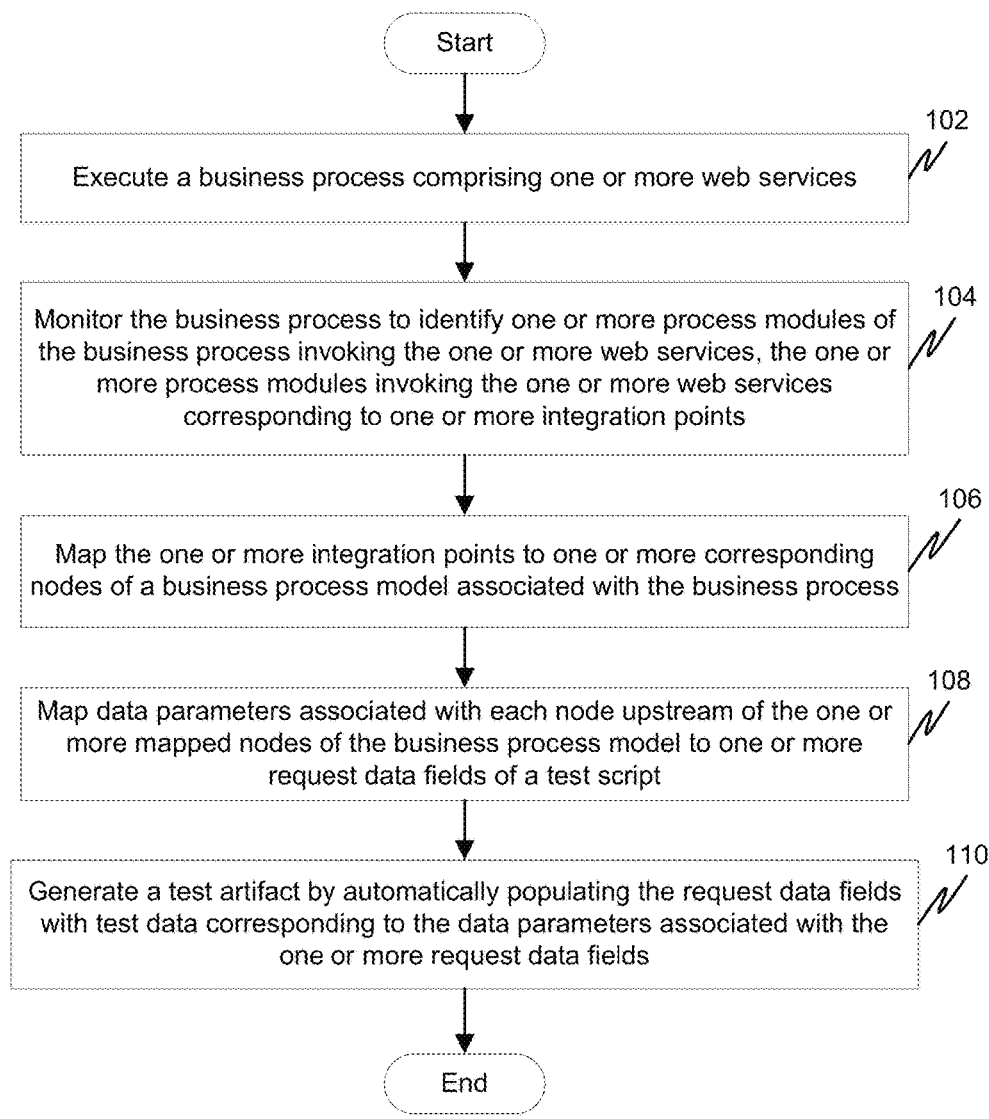
FIG. 1 illustrates a flow diagram of a method of automatically generating a test artifact in accordance with some embodiments of the present disclosure.

FIG. 1 illustrates a flowchart of a method of automatically generating a test artifact for testing a web service in accordance with some embodiments of the present disclosure. The method may involve executing, using a hardware processor, a business process including one or more web services at step 102. Here, a business process may include a collection of related, structured activities or tasks implemented in one or more programming languages. In a Service-Oriented Architecture (SOA), a large application may be created using a number of building blocks that each correspond to a sub function of the large application. A business process in this context may be considered to be an application that produces a specific service or product and serves a particular goal. The sub functions of the business process may be provided by process modules. Here, a process module may correspond to a software implementation of a particular task or activity associated with the business process.

For example, a simple business process may include automatically providing weather temperature to a user based on location of the user. In this case, the various steps involved to accomplish the goal of automatically providing weather temperature to the user may include: authenticating the user based on a username and password provided by the user, determining an approximate location of the user using the Internet Protocol (IP) address of a device used by the user, obtaining temperature information for the location from one or more online sources, and converting the obtained temperature from Fahrenheit to Celsius or vice versa depending on a predefined preference of the user. Each of the above steps may be implemented by a process module. In some cases, one or more process modules may be a web service. In other words, one or more sub functions of the business process may be performed by one or more web services. A web service may be defined as a software function provided at a network address over the Internet. In the above example, conversion of the temperature from Fahrenheit to Celsius or vice versa may be performed by a web service. In this case, the process module associated with obtaining temperature information may invoke or 'call' the web service to convert from Fahrenheit to Celsius or vice versa.

During execution of the business process, the business process may be monitored at step 104 by one or more agents to identify one or more process modules of the business process that invoke or call one or more web services. In some embodiments, each process module of the business process may be executed in sequence one after another and the one or more agents may monitor the execution to determine if a process module calls a web service. The one or more agents may monitor transactions of a process module during execution to determine if the transactions indicate a web service call. For example, the execution of a process module may be monitored to check if the process module calls a particular URL unique to a web service. A process module that calls or invokes one or more web services may be considered an integration point in the business process in the context of the present disclosure. In other words, the phrase "integration point" may conceptually refer to a point in the business process where one subsystem of the process interacts with a web service. On identifying an integration point, integration details such as, but not limited to, WSDL URI and Web Service Operation may be captured and saved. Typically, in a software testing environment, integration testing may correspond to testing the combination of individual software or process modules. The individual process modules may be unit tested separately and then combined and tested as a group in order to test the group as a whole.

On identifying the integration points associated with the business process, the integration points may be mapped to a Business Process Model (BPM) associated with the business process at step 106. The BPM associated with the business process may correspond to a graphical representation of the various activities or tasks associated with the business process. In some embodiments, the BPM may be an Extensible Markup Language (XML) representation. Typically, the BPM may be a flow diagram that represents the various activities or tasks of a business process as 'nodes' in the BPM. In other words, the BPM represents a logical flow of the activities to be accomplished in order to achieve an end goal. The BPM may be created during the design phase of a business process to enable technical and business stakeholders to understand what activities are to be performed, which person or team is responsible for the activities, a logical flow to the activities and so on. The BPM may be the starting point for software developers to create process modules that correspond to the functionality of the nodes of the business process model. Nodes of the BPM may be associated with data parameters that indicate the input and output parameters for that particular node. For example, if a node represents an authentication operation, the input data parameters associated with that node may include a username and password. Similarly, the output parameters may include "authenticated" or "not authenticated". The data parameters for a node may enable different developer teams to work independently of each other to independently create process modules. In keeping with the earlier example, different development teams may be allocated the task of creating a process module for authenticating a user and determining an approximate location of the user once the user is authenticated. The team responsible for developing the module for determining approximate location may see that the output from the authentication module may be "authenticated" or "not authenticated" and accordingly develop the process module to cater to these two situations without needing to know the exact functionality of the authentication module.

In some embodiments, one or more critical paths of the business process may be identified by parsing the BPM. The critical paths may be identified as those paths that include one or more critical nodes. The critical nodes may be predefined. The criticality assigned to the process paths may help in deriving the priority of the integration point mapped to the process path when a risk based test approach is adopted for testing the integration points.

"Mapping" the identified integration points to the corresponding nodes of the BPM may include, in some embodiments, "marking" the position of the integration point on the graphical representation of the BPM. In some embodiments, the specifications associated with the integration point may be used to map the integration point to the corresponding node of the BPM. For example, the <operation name> elements of the WSDL corresponding to the integration point may be examined to determine what operations are being exposed by the web service and accordingly, the nodes of the BPM which invoke these operations may be marked as integration points. It is to be noted that mapping the integration points to the BPM correlates the integration points identified during execution of the business process to nodes of the BPM representation of the business process.

Once the correlation between the integration points and the nodes of the BPM are established, test scripts to test the one or more web services of the business process may be generated. In some embodiments, the specification associated with the web service associated with a particular integration point may be used to automatically generate integration test scripts. For example, the WSDL of the web service may be used to auto-generate a test script to test the integration between the process module and the web service. Further, basic assertions like validating Request XMLs and WSDL contracts for schema and SOAP compliance etc. may be generated along with the test scripts. The test scripts generated for each integration point based on the associated web service may include one or more request data fields and one or more response data fields. The request data fields and the response data fields for an integration point may be identified based on the specifications of the associated web service. For example, the WSDL specification of the web service may be examined to determine the various operations exposed by the web service and accordingly request/ response data fields may be generated as part of the test script to test the various operations of the web service. In some embodiments, one or more third party SOA testing tools may be used to generate the test scripts. One or more Application Program Interfaces (APIs) associated with the SOA testing tools may be invoked to generate the test scripts. The specifications or WSDLs of the web service may be provided to the SOA testing tools through the APIs to automatically generate integration test scripts for the web service.

On generating the test scripts for the integration points, the data parameters upstream of the nodes to which the integration points are mapped may be mapped to the request data fields of the integration test scripts at step 108. Here, the various process paths to which a node that is marked as an integration point belongs may be identified and the data parameters associated with nodes from the mapped node to the start of the process paths may be mapped to the request XMLs of the test script. In this way, the request data fields of the test script may be populated with all the data parameters that may be consumed by the web service thereby covering a large set of testing scenarios. The mapped fields may be displayed along with any unmapped fields for the end user to modify/confirm the mapping. In addition to the request data fields, the test script may further include one or more response data fields. The response data fields may indicate the expected response to a given request. While the request XML indicates a particular request to a server hosting the web service, the response XML indicates an expected response from the server. As is the case with the request data fields, the response data fields may also be identified based on the specification of the web service associated with the each of the one or more integration points. The response data fields may be mapped to data parameters associated with each node upstream and downstream of the integration point in order to cover all nodes that may possibly consume the response XML data fields.

Once the mappings are confirmed, a test artifact to test the web service may be generated by automatically populating the request data fields with test data corresponding to the data parameters associated with the one or more request data fields at step 110. For each node in the process path that lies before the integration point, the various data parameters may be captured and then test data for the various data parameters may be retrieved by connecting to relevant Information technology (IT) databases. The test data may be populated for the respective request data fields in the test script and the web services tested by executing the test artifact. In some embodiments, the test data may be generated in various formats such as, but not limited to, test data sheets or by updating the test data in the relevant SOA testing tool project directly by utilizing the SOA testing tool APIs. The test data may include all variations of values in order to comprehensively test the web service. In some embodiments, historical data may be stored in the databases and used as test data. In other embodiments, random value generators may be used to generate random test data. Further, data classification techniques such as boundary values and equivalence classes that are applicable for the various fields of the request data fields may be considered when populating the test script with test data. The outputs for the test data may be compared with the response data fields to verify functionality of the web service. In some embodiments, orthogonal arrays may be applied to optimize the request/response pairs used for the testing. By optimizing the test data, redundant testing may be avoided.

In some embodiments, the request/response data pair may be saved in a database. The request/response data pair along with the integration point details such as web service WSDL may be leveraged to auto-generate Virtual Services corresponding to a particular WSDL. The Virtual Service image generated may typically only contain sample Request/Response XML data. This Virtual Service image may be enhanced to make the Virtual Service more realistic by adding the Request and Response XML pairs to the request/ response pair repository maintained as part of the Virtual Service Image. These virtual service maintained in the repository may be reused for future testing scenarios.

Figure 2:
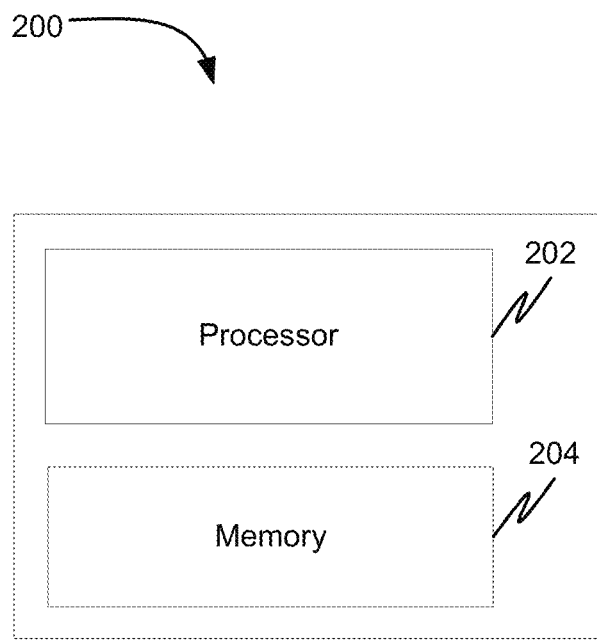
FIG. 2 is a functional block diagram of a system for automatically generating a test artifact in accordance with some embodiments of the present disclosure.

FIG. 2 illustrates a block diagram of a system 200 for automatically generating a test artifact. System 200 may include a processor 202 and a memory 204 storing instructions executable by processor 202. The instructions may include instructions to cause processor 202 to execute a business process including one or more web services. A business process in this context may be considered to be an application that produces a specific service or product and serves a particular goal. The sub functions of the business process may be provided by process modules. Here, a process module may correspond to a software implementation of a particular task or activity associated with the business process. In some cases, one or more process modules may be a web service. In other words, one or more sub functions of the business process may be performed by one or more web services. A web service may be defined as a software function provided at a network address over the Internet.

During the execution of the business process, processor 202 may monitor the execution of the business process to identify one or more process modules of the business process that invoke or call one or more web services. In some embodiments, processor 202 may execute each process module of the business process in sequence one after another and monitor the execution to determine if a process module calls a web service. Processor 202 may monitor transactions of a process module during execution to determine if the transactions indicate a web service call. For example, the execution of a process module may be monitored to check if the process module calls a particular URL unique to a web service. A process module that calls or invokes one or more web services may be considered an integration point in the business process in the context of the present disclosure. On identifying an integration point, processor 202 may capture integration details such as, but not limited to, WSDL URI and Web Service Operation and save the integration details in memory 204.

On identifying the integration points associated with the business process, processor 202 may map the integration points to a Business Process Model (BPM) associated with the business process. The BPM associated with the business process may correspond to a graphical representation of the various activities or tasks associated with the business process. In some embodiments, the BPM may be an Extensible Markup Language (XML) representation. The BPM may be the starting point for software developers to create process modules that correspond to the functionality of the nodes of the business process model. Nodes of the BPM may be associated with data parameters that indicate the input and output parameters for that particular node as explained in conjunction with FIG. 1.

In some embodiments, processor 202 may identify one or more critical paths of the business process by parsing the BPM. The critical paths may be identified as those paths that include one or more critical nodes. The critical nodes may be predefined. The criticality assigned to the process paths may help in deriving the priority of the integration point mapped to the process path when a risk based test approach is adopted for testing the integration points.

Mapping the identified integration points to the corresponding nodes of the BPM by processor 202 may include, in some embodiments, "marking" the position of the integration point on the graphical representation of the BPM. In some embodiments, the specifications associated with the integration point may be used to map the integration point to the corresponding node of the BPM as explained in conjunction with FIG. 1.

Once the correlation between the integration points and the nodes of the BPM are established, processor 202 may generate test scripts to test the one or more web services of the business process. In some embodiments, the specification associated with the web service associated with a particular integration point may be used to automatically generate integration test scripts. For example, the WSDL of the web service may be used to auto-generate a test script to test the integration between the process module and the web service. Further, processor 202 may generate basic assertions like validating Request XMLs and WSDL contracts for schema and SOAP compliance etc. while generating the test scripts. The test scripts generated for each integration point based on the associated web service may include one or more request data fields and one or more response data fields as explained in conjunction with FIG. 1. In some embodiments, one or more third party SOA testing tools may be used to generate the test scripts. One or more Application Program Interfaces (APIs) associated with the SOA testing tools may be invoked to generate the test scripts. The specifications or WSDLs of the web service may be provided to the SOA testing tools through the APIs to automatically generate integration test scripts for the web service.

On generating the test scripts for the integration points, processor 202 may map the data parameters upstream of the nodes to which the integration points are mapped to the request data fields of the integration test scripts. Here, the various process paths to which a node that is marked as an integration point belongs may be identified and the data parameters associated with nodes from the mapped node to the start of the process paths may be mapped to the request XMLs of the test script. In this way, the request data fields of the test script may be populated with all the data parameters that may be consumed by the web service thereby covering a large set of testing scenarios. The mapped fields may be displayed along with any unmapped fields for the end user to modify/confirm the mapping. In addition to the request data fields, the test script may further be generated with one or more response data fields. The response data fields may indicate the expected response to a given request. As is the case with the request data fields, the response data fields may also be identified based on the specification of the web service associated with the each of the one or more integration points. The response data fields may be mapped to data parameters associated with each node upstream and downstream of the integration point. Mapping the response data fields to data parameters upstream and downstream enables covering a larger test scenario since all the data parameters that may lead up to and lead away from an integration point in a process path may be tested.

Once the mappings are confirmed, processor 202 may automatically generate a test artifact to test the web service by automatically populating the request data fields with test data corresponding to the data parameters associated with the one or more request data fields. For each node in the process path that lies before the integration point, the various data parameters may be captured and then test data for the various data parameters may be retrieved by connecting to relevant Information technology (IT) databases. The test data may be populated for the respective request data fields in the test script and the web services tested by executing the test artifact. In some embodiments, the test data may be generated in various formats such as, but not limited to, test data sheets or by updating the test data in the relevant SOA testing tool project directly by utilizing the SOA testing tool APIs. The test data may include all variations of values in order to comprehensively test the web service. In some embodiments, historical data may be stored in the databases and used as test data. In other embodiments, random value generators may be used to generate random test data. Further, data classification techniques such as boundary values and equivalence classes that are applicable for the various fields of the request data fields may be considered when populating the test script with test data. The outputs for the test data may be compared with the response data fields to verify functionality of the web service.

In some embodiments, processor 202 may save the request/response data pair in memory 204. The request/response data pair along with the integration point details such as web service WSDL may be leveraged to auto-generate Virtual Services corresponding to a particular WSDL. The Virtual Service image generated may typically only contain sample Request/Response XML data. This Virtual Service image may be enhanced to make the Virtual Service more realistic by adding the Request and Response XML pairs to the request/response pair repository maintained as part of the Virtual Service Image. These virtual service maintained in the repository may be reused for future testing scenarios.

Computer System

FIG. 3 is a block diagram of an exemplary computer system for implementing embodiments consistent with the present disclosure. Variations of computer system 301 may be used for implementing system 200. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. (e.g., parsed BPM data, test scripts, test artifacts, mapping information, test data) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for automatically generating a test artifact. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of automatically generating a test artifact, the method comprising:
   executing, by a hardware processor, a business process comprising at least one web service;
   monitoring, by the a hardware processor, the business process to identify one or more process modules of the business process invoking the at least one web service, wherein the one or more process modules invoking the at least one web service correspond to one or more integration points;
   mapping, by the a hardware processor, the one or more integration points to one or more corresponding nodes of a business process model associated with the business process;
   mapping, by the a hardware processor, data parameters associated with each node upstream of the one or more mapped nodes of the business process model to one or more request data fields of a test script and data parameters associated with each node upstream and downstream of the one or more mapped nodes of the business process model to one or more response data fields of the test script;
   generating, by the a hardware processor, the test artifact by automatically populating the request data fields with test data corresponding to the data parameters associated with the one or more request data fields; and
   generating, by the hardware processor, at least one virtual service based on the one or more request data fields and the one or more response data fields.

2. The method of claim 1 further comprising:
   parsing, by a hardware processor, the business process model to identify one or more business process paths; and
   determining, by the a hardware processor, a criticality of the one or more business process paths based on a criticality of one or more nodes of the one or more business process paths.

3. The method of claim 1, wherein the one or more request data fields are identified based on a specification of the web service associated with the each of the one or more integration points.

4. The method of claim 1, wherein the test script comprises one or more response data fields identified based on a specification of the web service associated with the each of the one or more integration points.

5. The method of claim 4 further comprising:
   retrieving, by the a hardware processor, an expected output associated with the one or more response data fields from one or more databases.

6. The method of claim 1 further comprising:
   automatically retrieving, by the a hardware processor, test data corresponding to the data parameters associated with the one or more request data fields from one or more databases.

7. An artifact generating computing device comprising,
   a processor; and
   a memory communicatively coupled to the processor, wherein the memory stores processor instructions, which, on execution, causes the processor to:
   execute a business process comprising at least one web service;
   monitor the business process to identify one or more process modules of the business process invoking the at least one web service, wherein the one or more process modules invoking the at least one web service corresponds to one or more integration points;
   map the one or more integration points to one or more corresponding nodes of a business process model associated with the business process;
   map data parameters associated with each node upstream of the one or more mapped nodes of the business process model to one or more request data fields of a test script and data parameters associated with each node upstream and downstream of the one or more mapped nodes of the business process model to one or more response data fields of the test script;
   generate the test artifact by automatically populating the request data fields with test data corresponding to the data parameters associated with the one or more request data fields; and
   generate at least one virtual service based on the one or more request data fields and the one or more response data fields.

8. The device of claim 7, wherein the processor coupled to the memory is further configured to be capable of executing at least one additional programmed instruction comprising and stored in the memory to:
   parse the business process model to identify one or more business process paths; and
   determine a criticality of the one or more business process paths based on a criticality of one or more nodes of the one or more business process paths.

9. The device of claim 7, wherein the one or more request data fields are identified based on a specification of the web service associated with the each of the one or more integration points.

10. The device of claim 7, wherein the test script comprises one or more response data fields identified based on a specification of the web service associated with the each of the one or more integration points.

11. The device of claim 10, wherein the processor coupled to the memory is further configured to be capable of executing at least one additional programmed instruction comprising and stored in the memory to:
retrieve an expected output associated with the one or more response data fields from one or more databases.

12. The device of claim 7, wherein the processor coupled to the memory is further configured to be capable of executing at least one additional programmed instruction comprising and stored in the memory to automatically retrieve test data corresponding to the data parameters associated with the one or more request data fields from one or more databases.

13. A non-transitory computer readable medium having stored thereon, a set of computer-executable instructions for causing a computer comprising one or more hardware processors to perform steps comprising:
executing a business process comprising at least one web service;
monitoring the business process to identify one or more process modules of the business process invoking the at least one web service, wherein the one or more process modules invoking the at least one web service correspond to one or more integration points;
mapping the one or more integration points to one or more corresponding nodes of a business process model associated with the business process;
mapping data parameters associated with each node upstream of the one or more mapped nodes of the business process model to one or more request data fields of a test script and data parameters associated with each node upstream and downstream of the one or more mapped nodes of the business process model to one or more response data fields of the test script;
generating the test artifact by automatically populating the request data fields with test data corresponding to the data parameters associated with the one or more request data fields; and
generating at least one virtual service based on the one or more request data fields and the one or more response data fields.

14. The medium of claim 13 further having stored thereon at least one additional instruction that when executed by the processor cause the processor to perform at least one additional step comprising:
parsing the business process model to identify one or more business process paths; and
determining a criticality of the one or more business process paths based on a criticality of one or more nodes of the one or more business process paths.

15. The medium of claim 13, wherein the one or more request data fields are identified based on a specification of the web service associated with the each of the one or more integration points.

16. The medium of claim 13, wherein the test script comprises one or more response data fields identified based on a specification of the web service associated with the each of the one or more integration points.

17. The medium of claim 16 further having stored thereon at least one additional instruction that when executed by the processor cause the processor to perform at least one additional step comprising:
retrieving an expected output associated with the one or more response data fields from one or more databases.

18. The medium of claim 13 further having stored thereon at least one additional instruction that when executed by the processor cause the processor to perform at least one additional step comprising:
automatically retrieving test data corresponding to the data parameters associated with the one or more request data fields from one or more databases.

* * * * *